Patented Jan. 27, 1953

2,626,861

UNITED STATES PATENT OFFICE 2,626,861

METHOD OF OBTAINING A PYROTECHNICAL COMPOSITION

Jean León Maurice Frejacques, Paris, France, assignor to Pechiney Compagnie de Produits Chimiques et Electrometallurgiques, a French corporation No Drawing. Application May 16, 1947, Serial No. 748,655. In France September 6, 1946

14 Claims. (Cl. 52—23)

It is a known fact that the addition of certain products to potassium chlorate solutions makes it possible to obtain, after crystallizing, crystals of shapes very different from those of normal crystals and variable within wide limits according to the nature and the proportion of product that is employed. These products may for instance consist of certain colouring materials, such as the well known Congo Red and as Foulon Violet, or Diazol Scarlet, both manufactured by Francolor Corporation, or sulphonated organic products such as described in my United States Patent No. 2,595,238 issued May 6, 1952, for Method of Producing Potassium Chlorate Crystals of Special Appearance.

As a rule, from 0.5 to 1 per cent of these prodducts is sufficient as addition into the solutions to be caused to crystallize, for obtaining potassium chlorate crystals of special appearance.

These particular crystals may have one of the following aspects:

*a.* Relatively long and very thin laminas, by crystallization with, for instance, for example, in the presence of the sodium salt of 3-6 disulpho-8 hydroxy alpha-naphthalene-azo-phenyl-alpha-naphthylamine 8 sulphonic acid, commonly designated as Solid Blue 5R or Aceko Fast Blue 2R.

*b.* Very small laminas having ragged edges, for instance by crystallization with in the presence of the sodium salt of 4:4'-disulphonated 1:1'-diamino - dinaphthyl - 2:2'-bis-diazobenzidine, commonly named Congo Red;

*c.* Spherical crystals, for instance by crystallization with in the presence of the sodium salt of benzene-azo - 7:7'-disulpho - 5:5'-dihydroxynaphthyl - 2:2'-urea-azo-p-acetylamino benzene, commonly named Diazol Scarlet 4BS or Direct Fast Scarlet;

*d.* Long and very fine needles, for instance by crystallization in the presence of the sodium salt of dibenzyltetraethyl-triamino-triphenylcarbinol disulphonic acid anhydride, commonly designated as Acid Violet 5B or S.4.B. Foulon Violet, manufactured by Francolor Corporation, or sodium salts of highly sulphonated paraffins.

Now I have found that the utilization of these crystals for the manufacture of pastes for the production of matches permits of obtaining pastes which are much more active than those obtained with ordinary tabular crystals.

Thus, if I use for comparison a paste for the manufacture of matches consisting of:

25 grams of ordinary potassium chlorate passing through the 120 mesh sieve;
10 grams of antimony sulphide;
25 cm.³ of 25 per cent joiner's glue;
5 cm.³ of water, and if I prepare similar pastes but with the special crystal forms of potassium chlorate above referred to, I find, for the rate of combustion of these pastes, the following values, value 1 corresponding to the standard paste made with ordinary crystals:

Paste made with spherical crystals_____ 2
Paste made with laminar crystals_____ 2
Paste made wtih needle crystals_____ 65

These effects are chiefly due to the very high increase of the specific area of the crystals. This area, which is about 350 cm.² for 1 gram of ordinary chlorate passing through the 120 mesh sieve, becomes 1700 cm.² in the case of needle shaped crystals.

Matches made with these special pastes have greatly improved characteristics, as shown by the following table.

In this table, the characteristics that are mentioned are given in relative values, the unit corresponding, for each of them, to the characteristic of the standard paste taken for comparison:

I. Activity (this quality characterizes the violence of combustion of the paste).

Standard paste with normal crystals_____ 1
Paste with laminar crystals_____ 1.50
Paste with spherical crystals_____ 1.67
Paste with needle shaped crystals_____ 1.80

II. Regularity (this quality characterizes the homogeneity of combustion of the paste).

Standard paste with normal crystals_____ 1
Paste with laminar crystals_____ 1.20
Paste with spherical crystals_____ 1.30
Paste with needle shaped crystals_____ 1.60

III. Intensity (this quality characterizes the rapidity of combustion of the paste).

Standard paste with normal crystals_____ 1
Paste with laminar crystals_____ 2.7
Paste with spherical crystals_____ 1.6
Paste with needle shaped crystals_____ 3.3

IV. Facility of ignition (on a red phosphorus striker).

Standard paste with normal crystals_____ 1.
Paste with laminar crystals_____ 2.5
Paste with spherical crystals_____ 1.5
Paste with needle shaped crystals_____ 4.

V. Come back (this quality cahracterizes the wind velocity which prevents the paste from giving a flame when burning).

Standard paste _____ 1
Paste with spherical crystals_____ 1.3
Paste with laminar crystals_____ 1.7
Paste with needle shaped crystals_____ 2

All these values show how much the chemical activity of the special potassium chlorate crystals improves the qualities of matches made with pastes incorporating these crystals.

These special chlorate crystals may also, according to my invention, be incorporated in the composition of chlorate explosives, fireworks and pyrotechnical mixtures.

It goes without saying that the special chlorates above referred to may be used either alone or in mixture with ordinary crystal chlorates. These mixtures will permit of obtaining any range of qualities as may be desired.

In a general manner, while I have, in the above description, disclosed what I deem to be practical and efficient embodiments of the present invention, it should be well understood that I do not wish to be limited thereto as there might be changes made therein without departing from the principle of my invention as comprehended within the scope of the accompanying claims.

What I claim is:

1. A method of obtaining a pyrotechnical composition, which comprises adding to a hot saturated solution of potassium chlorate a small amount, in relation to the weight of said solution, of a surface active body selected from the group consisting of sulphonated derivatives of naphthalene and alkyl naphthalenes, sulphonated fatty alcohols, sulphonated paraffinic hydrocarbons, alkali salts of these sulphonated compounds, sodium salt of 3–6 disulpho-8-hydroxy alpha naphthalene - azo - phenyl - alpha-naphthylamine 8 sulphonic acid, sodium salt of 4:4'-disulphonated 1:1'-diamino-dinaphthyl-2:2'-bis-diazobenzidine, sodium salt of benzene-azo-7:7'-disulpho - 5:5'-dihydroxynaphthyl-2:2'-urea-azo-p-acetyl-aminobenzene, sodium salt of dibenzyl-tetraethyl - triamino - triphenylcarbinol disulphonic acid anhydride, allowing potassium chlorate to crystallize and incorporating the so obtained crystals into the pyrotechnical composition.

2. A method of obtaining a pyrotechnical composition, which comprises adding to a hot saturated solution of potassium chlorate a small amount, in relation to the weight of said solution, of sodium salt of 3–6 disulpho-8-hydroxy alpha naphthalene-azo-phenyl-alpha-naphthylamine 8 sulphonic acid, allowing potassium chlorate to crystallize and incorporating so obtained crystals into the pyrotechnical comosition.

3. A method of obtaining a pyrotechnical composition, which comprises adding to a hot saturated solution of potassium chlorate a small amount, in relation to the weight of said solution, of sodium salt of 4:4'-disulphonated 1:1'-diamino-dinaphthyl-2:2'-bis-diazobenzidine, allowing potassium chlorate to crystalize and incorporating so obtained crystals into the pyrotechnical composition.

4. A method of obtaining a pyrotechnical composition, which comprises adding to a hot saturated solution of potassium chlorate a small amount, in relation to the weight of said solution, of sodium salt of benzene-azo-7:7'-disulpho - 5:5'-dihydroxynaphthyl - 2:2'-urea-azo-p-acetyl-amino-benzene, allowing potassium chlorate to crystallize and incorporating so obtained crystals into the pyrotechnical composition.

5. A method of obtaining a pyrotechnical composition, which comprises adding to a hot saturated solution of potassium chlorate a small amount, in relation to the weight of said solution, of sodium salt of dibenzyltetraethyl-triamino-triphenyl-carbinol disulphonic acid anhydride, allowing potassium chlorate to crystallize and incorporating so obtained crystals into the pyrotechnical composition.

6. A method of obtaining a pyrotechnical composition, which comprises adding to a hot saturated solution of potassium chlorate a small amount, in relation to the weight of said solution, of a surface active alkali salt of highly sulphonated paraffin, allowing potassium chlorate to crystallize and incorporating so obtained crystals into the pyrotechnical composition.

7. A method of obtaining a pyrotechnical composition, which comprises adding to a hot saturated solution of potassium chlorate a small amount, in relation to the weight of said solution, of a surface active body selected from the group consisting of sulphonated derivatives of naphthalene and alkyl naphthalenes, sulphonated fatty alcohols, sulphonated paraffinic hydrocarbons, alkali salts of these sulphonated compounds, sodium salt of 3–6 disulpho-8-hydroxy alpha naphthalene - azo - phenyl-alpha-naphthylamine 8 sulphonic acid, sodium salt of 4:4' - disulphonated 1:1' - diamino-dinaphthyl-2:2'-bis-diazobenzidine, sodium salt of benzene-azo-7:7'-disulpho - 5:5'-dihydroxynaphthyl-2:2'-urea-azo-p-acetyl-amino-benzene, sodium salt of dibenzyltetraethyl - triamino - triphenylcarbinol disulphonic acid anhydride, allowing potassium chlorate to crystallize, mixing so obtained potassium chlorate crystals with ordinary potassium chlorate crystals in proportion adapted to adjust the pyrotechnical characteristics of the mixture, and incorporating the said mixture of potassium chlorate crystals into the pyrotechnical composition.

8. A method of obtaining a pyrotechnical composition, which comprises adding to a hot saturated solution of potassium chlorate 0.5 to 1 per cent, in relation to the weight of said solution, of a surface active body selected from the group consisting of sulphonated derivatives of naphthalene and alkyl naphthalenes, sulphonated fatty alcohols, sulphonated paraffinic hydrocarbons, alkali salts of these sulphonated compounds, sodium salt of 3–6 disulpho-8-hydroxy alpha naphthalene - azo - phenyl-alpha-naphthylamine 8 sulphonic acid, sodium salt of 4:4' - disulphonated 1:1' - diamino-dinaphthyl-2:2'-bis-diazobenzidine, sodium salt of benzene-azo-7:7'-disulpho - 5:5'-dihydroxynaphthyl-2:2'-urea-azo-p-acetyl-aminobenzene, sodium salt of dibenzyl-tetraethyl - triamino - triphenylcarbinol disulphonic acid anhydride, allowing potassium chlorate to crystallize and incorporating the so obtained crystals into the pyrotechnical composition.

9. A method of obtaining a pyrotechnical composition, which comprises adding to a hot saturated solution of potassium chlorate 0.5 to 1 per cent, in relation to the weight of said solution, of sodium salt of 3–6 disulpho-8-hydroxy alpha naphthalene-azo-phenyl-alpha-naphthylamine 8 sulphonic acid, allowing potassium chlorate to crystallize and incorporating so obtained crystals into the pyrotechnical composition.

10. A method of obtaining a pyrotechnical composition, which comprises adding to a hot saturated solution of potassium chlorate 0.5 to 1 per cent, in relation to the weight of said solution, of sodium salt of 4:4'-disulphonated 1:1'-diamino-dinaphthyl-2:2'-bis-diazobenzidine, allowing potassium chlorate to crystallize and incorporating so obtained crystals into the pyrotechnical composition.

11. A method of obtaining a pyrotechnical composition, which comprises adding to a hot saturated solution of potassium chlorate 0.5 to 1 per cent, in relation to the weight of said solution, of sodium salt of benzene-azo-7:7'-disulpho - 5:5'-dihydroxynaphthyl - 2:2'-urea-azo-p-acetyl-amino-benzene, allowing potassium chlorate to crystallize and incorporating so obtained crystals into the pyrotechnical composition.

12. A method of obtaining a pyrotechnical composition, which comprises adding to a hot saturated solution of potassium chlorate 0.5 to 1 per cent, in relation to the weight of said solution, of sodium salt of dibenzyltetraethyl-triamino-triphenyl-carbinol disulphonic acid anhydride, allowing potassium chlorate to crystallize and incorporating so obtained crystals into the pyrotechnical composition.

13. A method of obtaining a pyrotechnical composition, which comprises adding to a hot saturated solution of potassium chlorate 0.5 to 1 per cent, in relation to the weight of said solution, of a surface active alkali salt of highly sulphonated paraffin, allowing potassium chlorate to crystallize and incorporating so obtained crystals into the pyrotechnical composition.

14. A method of obtaining a pyrotechnical composition, which comprises adding to a hot saturated solution of potassium chlorate 0.5 to 1 per cent, in relation to the weight of said solution, of a surface active body selected from the group consisting of sulphonated derivatives of naphthalene and alkyl naphthalenes, sulphonated fatty alcohols, sulphonated paraffinic hydrocarbons, alkali salts of these sulphonated compounds, sodium salt of 3-6 disulpho-8-hydroxy alpha naphthalene-azo - phenyl - alpha-naphthylamine 8 sulphonic acid, sodium salt of 4:4' - disulphonated 1:1' - diamino - dinaphthyl-2:2'-bis-diazobenzidine, sodium salt of benzene-azo-7:7'-disulpho - 5:5'-dihydroxynaphthyl-2:2'-urea-azo-p-acetyl-amino-benzene, sodium salt of dibenzyltetraethyl - triamino - triphenylcarbinol disulphonic acid anhydride, allowing potassium chlorate to crystallize, mixing so obtained potassium chlorate crystals with ordinary potassium chlorate crystals in proportion adapted to adjust the pyrotechnical characteristics of the mixture, and incorporating the said mixture of potassium chlorate crystals into the pyrotechnical composition.

JEAN LÉON MAURICE FREJACQUES.

REFERENCES CITED

The following references are of record in the file of this patent:

UNITED STATES PATENTS

| Number | Name | Date |
|---|---|---|
| 86,299 | Graham | Jan. 26, 1869 |
| 562,426 | Schweining | June 23, 1896 |

FOREIGN PATENTS

| Number | Country | Date |
|---|---|---|
| 28,974 | Great Britain | of 1911 |